(12) United States Patent
Delventhal et al.

(10) Patent No.: US 7,090,304 B2
(45) Date of Patent: Aug. 15, 2006

(54) RETRACTOR HAVING VEHICLE SENSITIVE SENSOR DISABLING MECHANISM

(75) Inventors: Neal H. Delventhal, Lake Orion, MI (US); Edgar H. Schlaps, Washington, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 10/893,175

(22) Filed: Jul. 16, 2004

(65) Prior Publication Data

US 2006/0012237 A1    Jan. 19, 2006

(51) Int. Cl.
*B60R 22/36* (2006.01)
*B60R 22/34* (2006.01)
*B60R 22/46* (2006.01)
*A62B 35/00* (2006.01)

(52) U.S. Cl. ..................................... 297/478
(58) Field of Classification Search ................ 297/478
See application file for complete search history.

(56) References Cited

U.S. PATENT DOCUMENTS

| | | | | |
|---|---|---|---|---|
| 3,790,098 A | | 2/1974 | Lewis | |
| 3,918,658 A | * | 11/1975 | Beller | 242/383.4 |
| 4,084,840 A | * | 4/1978 | Buff et al. | 297/478 |
| 4,128,261 A | * | 12/1978 | Paitula | 297/478 |
| 4,135,410 A | * | 1/1979 | Filderman | 74/411.5 |
| 4,135,683 A | * | 1/1979 | Stephenson et al. | 242/378.4 |
| 4,422,594 A | * | 12/1983 | Honl | 242/383.4 |
| 5,071,194 A | * | 12/1991 | Fohl | 297/478 |
| 5,169,085 A | | 12/1992 | Boelstler et al. | |
| 5,242,213 A | * | 9/1993 | Fohl | 297/472 |
| 5,462,340 A | * | 10/1995 | Imai et al. | 297/478 |
| 5,495,994 A | * | 3/1996 | Rumpf et al. | 242/384.4 |
| 5,505,400 A | | 4/1996 | Boelstler et al. | |
| 5,669,573 A | | 9/1997 | Hirzel | |
| 5,695,146 A | | 12/1997 | Schmidt et al. | |
| 5,716,102 A | | 2/1998 | Ray et al. | |
| 5,794,879 A | | 8/1998 | Huber | |
| 5,826,813 A | | 10/1998 | Hibata | |
| 5,839,790 A | * | 11/1998 | Doty | 297/478 |
| 5,882,084 A | | 3/1999 | Verellen et al. | |
| 6,152,393 A | | 11/2000 | Ando et al. | |
| 6,186,431 B1 | | 2/2001 | Biller et al. | |
| 6,244,663 B1 | * | 6/2001 | Doty | 297/478 |
| 6,340,209 B1 | * | 1/2002 | Yamamoto et al. | 297/478 |
| 6,371,563 B1 | * | 4/2002 | Washizuka | 297/476 |
| 6,443,382 B1 | * | 9/2002 | Bae | 242/382.6 |
| 6,578,419 B1 | * | 6/2003 | Murayama | 73/493 |

\* cited by examiner

*Primary Examiner*—Rodney B. White
(74) *Attorney, Agent, or Firm*—Tarolli, Sundheim, Covell & Tummino LLP (57) ABSTRACT

A seat belt retractor (10) includes a spool (104) about which seat belt webbing (18) is wound. The spool (104) is supported for rotation in a belt withdrawal direction and in an opposite belt retraction direction. A vehicle sensitive sensor (180) is responsive to at least one sensed vehicle condition for preventing rotation of the spool (104) in the belt withdrawal direction. The retractor (10) also includes a mechanism (200) for controlling the vehicle sensitive sensor (180). The mechanism (200) includes a ring gear (212) and a control lever (246). The ring gear (212) has internal gear teeth (234) and an external surface (236) having a cam profile. The external surface (236) of the ring gear (212) actuates the control lever (246) to enable and disable the vehicle sensitive sensor (180).

17 Claims, 5 Drawing Sheets

RETRACTOR HAVING VEHICLE SENSITIVE SENSOR DISABLING MECHANISM

TECHNICAL FIELD

The present invention relates to a retractor for a vehicle seat belt system. More particularly, the present invention relates to a retractor that includes a mechanism for disabling a vehicle sensitive sensor.

BACKGROUND OF THE INVENTION

Many vehicle seat belt retractors include a vehicle sensitive sensor. The vehicle sensitive sensor is responsive to certain vehicle conditions, such as vehicle deceleration and tilt, for preventing rotation of a spool of the retractor in a belt withdrawal direction.

It is common in some vehicles to locate the seat belt retractor in the backrest portion of the seat. When a seat belt retractor that is mounted in the backrest portion of the seat includes a vehicle sensitive sensor, the reclining or folding of the backrest portion of the seat may result in the vehicle sensitive sensor preventing rotation of the spool in a belt withdrawal direction. The spool of the retractor, however, may still rotate in the belt retraction direction to retract seat belt webbing. If the seat belt webbing retracts into the retractor when the backrest portion of the seat is in a folded or reclined condition and the vehicle sensitive sensor prevents rotation of the spool in the belt withdrawal direction, the seat belt webbing is prevented from being withdrawn from the retractor, which may prevent the backrest portion of the seat from being returned to an upright position.

Similarly, prior to or during installation into a vehicle, the vehicle sensitive sensor of a retractor may be actuated to prevent rotation of the spool in the belt withdrawal direction. If, while the vehicle sensitive sensor is in the actuated condition, enough seat belt webbing is retracted into the retractor to pack the spool of the retractor solidly, the vehicle sensitive sensor may be prevented from returning to an unactuated condition. The seat belt webbing may thus be prevented from being withdrawn from the retractor.

A mechanism for disabling the vehicle sensitive sensor under certain conditions is desired. Such a mechanism, however, should not hinder the proper operation of the vehicle sensitive sensor when the seat belt webbing is being used for restraining an occupant in a vehicle seat.

SUMMARY OF THE INVENTION

The present invention relates to a seat belt retractor comprising a spool about which seat belt webbing is wound. The spool is supported for rotation in a belt withdrawal direction and in an opposite belt retraction direction. The retractor also comprises a vehicle sensitive sensor that is responsive to at least one sensed vehicle condition for preventing rotation of the spool in the belt withdrawal direction. The retractor further comprises a mechanism for controlling the vehicle sensitive sensor. The mechanism includes a ring gear and a control lever. The ring gear has internal gear teeth and an external surface having a cam profile. The external surface of the ring gear actuates the control lever to enable and disable the vehicle sensitive sensor.

According to another aspect, the present invention relates to a seat belt retractor comprising a spool about which seat belt webbing is wound. The spool is supported for rotation in a belt withdrawal direction and in an opposite belt retraction direction. The seat belt retractor also comprises a vehicle sensitive sensor that is responsive to at least one sensed vehicle condition for preventing rotation of the spool in the belt withdrawal direction. The seat belt retractor further comprises a mechanism for controlling the vehicle sensitive sensor. The mechanism includes a ring gear and a control lever. The ring gear has a peripheral portion having opposite inner and outer surfaces. A cam profile is formed on a first one of the inner and outer surfaces and gear teeth are formed on a second one of the inner and outer surfaces. The cam profile of the peripheral portion of the ring gear actuates the control lever to enable and disable the vehicle sensitive sensor.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
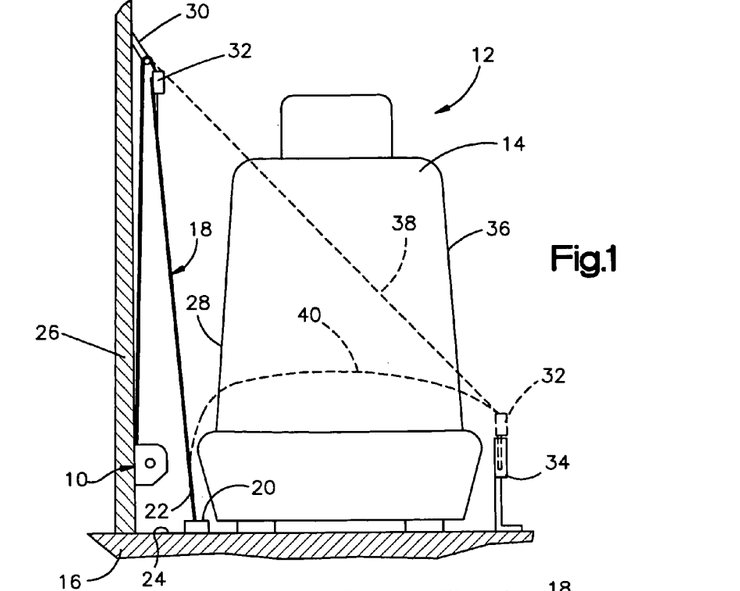
FIG. 1 is a schematic illustration of a vehicle seat belt system including a seat belt retractor constructed in accordance with the present invention.

FIG. 1 illustrates a seat belt webbing retractor 10 constructed in accordance with the present invention. As illustrated in FIG. 1, the retractor 10 forms a portion of a three-point continuous loop seat belt system 12 for use in helping to protect an occupant (not shown) of a seat 14, for example, the front passenger seat, of a vehicle 16. The retractor 10 of the present invention may be associated with any seat of the vehicle.

The seat belt system 12 includes a length of seat belt webbing 18. An anchor 20 fixes a first end 22 of the seat belt webbing 18 to the floor 24 of the vehicle 16 on a right side 28 of the seat 14, as viewed by the occupant of the seat. As an alternative to fixing the first end 22 of the seat belt webbing 18 to the floor 24 of the vehicle 16, the first end 22 of the seat belt webbing 18 may be fixed to the seat 14. A second end (not shown) of the seat belt webbing 18 is fixed to the retractor 10. FIG. 1 illustrates the retractor 10 secured to the B-pillar 26 of the vehicle 16. Alternatively, the retractor 10 may be fixed to another portion of the vehicle 16, such as the vehicle floor 24, a door of the vehicle, or may be fixed to the seat 14. The retractor 10 also is located on the right side 28 of the seat 14, as viewed by the occupant of the seat.

The seat belt webbing 18 extends upwardly from the retractor 10 and through a D-ring assembly 30 that is secured to the B-pillar 26 in a location spaced above the retractor. The seat belt webbing 18 extends downwardly from the D-ring assembly 30 to the anchor 20. A tongue assembly 32 is located on the seat belt webbing 18 between the D-ring assembly 30 and the anchor 20. The tongue assembly 32 is movable along the seat belt webbing 18.

The seat belt system 12 also includes a buckle assembly 34. The buckle assembly 34 is anchored to the floor 24 of the vehicle 16 on the left side 36 of the seat 14, as viewed by the occupant of the seat. Alternatively, the buckle assembly 34 may be fixed to the seat 14. The buckle assembly 34 receives and latches the tongue assembly 32 for securing the seat belt webbing 18 about the occupant of the seat 14.

When the seat belt system 12 is not in use, the seat belt webbing 18 is oriented generally vertically on the right side 28 of the seat 14, as is shown in FIG. 1 by solid lines. To engage the seat belt system 12, the tongue assembly 32 is manually grasped and is pulled across the occupant of the seat 14. As the tongue assembly 32 is pulled across the occupant, the tongue assembly 32 moves along the seat belt webbing 18 and seat belt webbing is withdrawn from the retractor 10. The movement of the tongue assembly 32 across the occupant pulls the seat belt webbing 18 across the lap and torso of the occupant. After the seat belt webbing 18 has been pulled across the lap and torso of the occupant, the tongue assembly 32 is inserted into the buckle assembly 34 and is latched in the buckle assembly. When the tongue assembly 32 is latched in the buckle assembly, the seat belt webbing 18 is in the position shown in FIG. 1 by dashed lines.

When the tongue assembly 32 is latched in the buckle assembly 34, the tongue assembly 32 divides the seat belt webbing 18 into a torso portion 38 and a lap portion 40. The torso portion 38 of the seat belt webbing 18 extends between the D-ring assembly 30 and the tongue assembly 32 and extends across the torso of the occupant of the seat 14. The lap portion 40 of the seat belt webbing 18 extends between the tongue assembly 32 and the anchor 20 and extends across the lap of the occupant of the seat 14.

Figure 2:
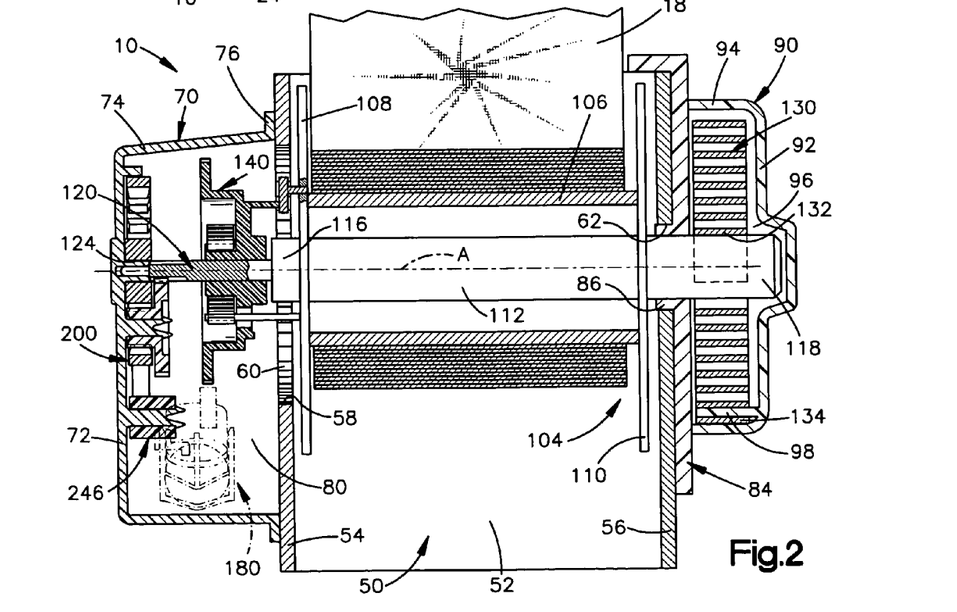
FIG. 2 is a schematic sectional view of the retractor of FIG. 1.

FIG. 2 is a schematic sectional view of the retractor 10 of FIG. 1. The retractor 10 includes a U-shaped frame 50. The frame 50 is stamped from a single piece of sheet metal and includes a base wall 52 and opposite first and second side walls 54 and 56, respectively. The first and second side walls 54 and 56 extend perpendicularly to the base wall 52. The base wall 52 of the frame 50 includes an aperture (not shown) for receiving a fastener (not shown) for fixing the retractor 10 to the vehicle 16.

A large diameter opening 58 extends through the first side wall 54 of the frame 50. Ratchet teeth 60 are formed on the first side wall 54. The ratchet teeth 60 extend radially inwardly into the opening 58. A smaller diameter opening 62 extends through the second side wall 56 of the frame 50. The openings 58 and 62 in the first and second side walls 54 and 56 are coaxial and are centered on axis A, as shown in FIG. 2.

A cover 70 is attached to the first side wall 54 of the frame 50 on a side of the first side wall facing away from the second side wall 56. The cover 70, shown schematically in FIGS. 2 and 3, includes an end wall 72, which extends radially relative to axis A, an outer wall 74, which extends generally parallel to axis A, and a radially extending flange 76. The outer wall 74 connects the end wall 72 and the radial flange 76. The radial flange 76 is affixed to the first side wall 54 of the frame 50. A chamber 80 is formed between the cover 70 and the first side wall 54 of the frame 50.

A plastic bearing member 84 is affixed to the second side wall 56 of the frame 50 on a side of the second side wall facing away from the first side wall 54. The bearing member 84 includes a cylindrical flange portion 86 that extends generally parallel to axis A and through the opening 62 in the second side wall 56 of the frame 50.

A cover 90 is attached to the bearing member 84. The cover 90 includes an end wall 92, which extends radially relative to axis A, and a cylindrical outer wall 94. A chamber 96 is formed between the cover 90 and the bearing member 84. A projection 98 extends axially into the chamber 96 from the end wall 92 of the cover 90 at a location adjacent the outer wall 94. As an alternative to the bearing member 84 including flange portion 86, a bearing member (not shown) may be formed on an interior surface of the end wall 92 of the cover 90.

The retractor 10 also includes a spool 104. The spool 104 includes a generally cylindrical webbing receiving portion 106, first and second webbing guides 108 and 110, respectively, and a central axle 112. The second end of the seat belt webbing 18 is fixed to the webbing receiving portion 106 of the spool 104 and a portion of the seat belt webbing adjacent the second end is wound about the webbing receiving portion of the spool. The webbing receiving portion 106 of the spool 104 is interposed between the first and second webbing guides 108 and 110. The first and second webbing guides 108 and 110 help to guide the seat belt webbing 18 onto the webbing receiving portion 106 of the spool 104 in an orderly manner.

A cylindrical post 114 (FIG. 3) extends axially away from the first webbing guide 108 in a direction opposite to the webbing receiving portion 106 of the spool 104. The cylindrical post 114 is spaced radially away from the central axle 112 of the spool 104. When the webbing receiving portion 106 of the spool 104 is positioned between the first and second side walls 54 and 56 of the frame 50, as is shown in FIG. 2, the cylindrical post 114 extends through the opening 58 in the first side wall 54 of the frame 50 in a location spaced radially away from axis A.

Figure 3:
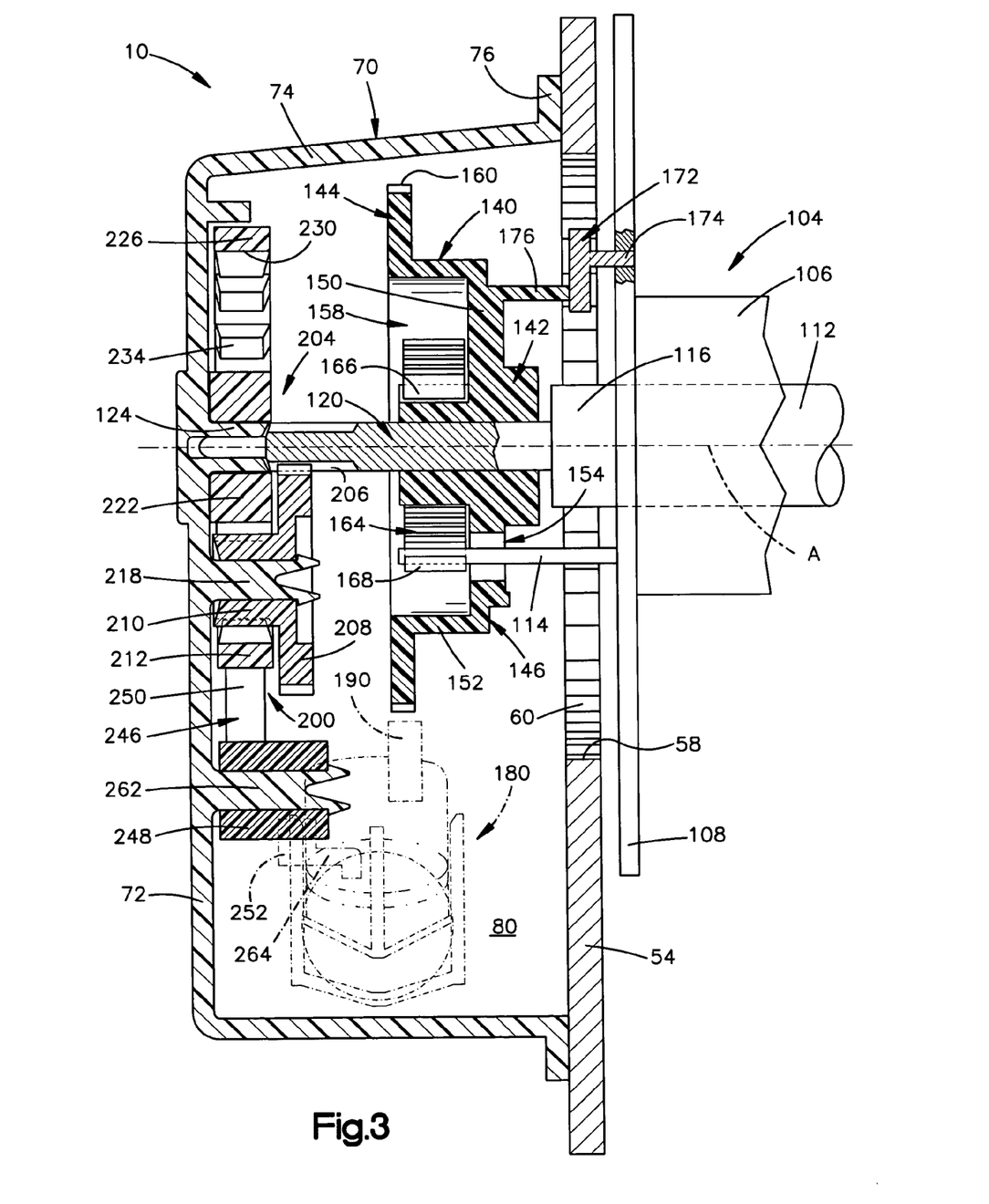
FIG. 3 is an enlarged view of a portion of the retractor of FIG. 2.

The central axle 112 of the spool 104 extends through the webbing receiving portion 106 of the spool and is fixed for rotation with the webbing receiving portion and the first and second webbing guides 108 and 110. The central axle 112 includes opposite first and second ends 116 and 118, respectively. The first end 116 of the central axle 112 extends outwardly of the first webbing guide 108 and through the opening 58 in the first side wall 54 of the frame 50. A cylindrical shaft 120 is affixed to the first end 116 of the central axle 112 and extends axially outwardly of the first end. Alternatively, the shaft 120 and the central axle 112 may be a one-piece unit and not separate pieces secured together. The shaft 120 is coaxial with the central axle 112 and has a diameter that is approximately one-third the diameter of the central axle. As is shown in FIG. 3, the shaft 120 is rotatably supported within a tubular protrusion 124 that extends into the chamber 80 from the end wall 72 of the cover 70.

As is shown in FIG. 2, the second end 118 of the central axle 112 extends outwardly of the second webbing guide 110 and through the opening 62 in the second side wall 56 of the frame 50. The cylindrical flange portion 86 of the bearing member 84 rotatably supports the second end 118 of the central axle 112. When a bearing member (not shown) formed on the interior surface of end wall 92 replaces the flange portion 86, the bearing member rotatably supports the second end 118 of the central axle 112.

The spool 104 is rotatable relative to the frame 50 about the central axle 112. An axis of rotation of the spool 104 is located on axis A. The spool 104 is rotatable in a belt retraction direction and in an opposite belt withdrawal direction.

The retractor 10 also includes a rewind spring 130 (FIG. 2). The rewind spring 130 is located within the chamber 96. The rewind spring 130 is a spiral or clock spring and has inner and outer ends 132 and 134, respectively. The inner end 132 of the rewind spring 130 is affixed to the second end 118 of the central axle 112 of the spool 104. The outer end 134 of the rewind spring 130 is affixed to the projection 98 that extends axially into the chamber 96 from the end wall 92 of the cover 90. The rewind spring 130 biases the spool 104 for rotation in the belt retraction direction.

The retractor 10 also includes an actuator disk 140. As shown in FIG. 3, the actuator disk 140 includes a hub portion 142, an annular flange portion 144, and a cup-shaped central portion 146 that extends between the hub portion and the flange portion. A passage extends axially through the hub portion 142 of the actuator disk 140. The passage is sized for receiving the shaft 120. The actuator disk 140 is preferably made from a low friction plastic material so that the hub portion 142 acts as a bearing for enabling relative rotation between the shaft 120 and the actuator disk 140.

Figure 4:
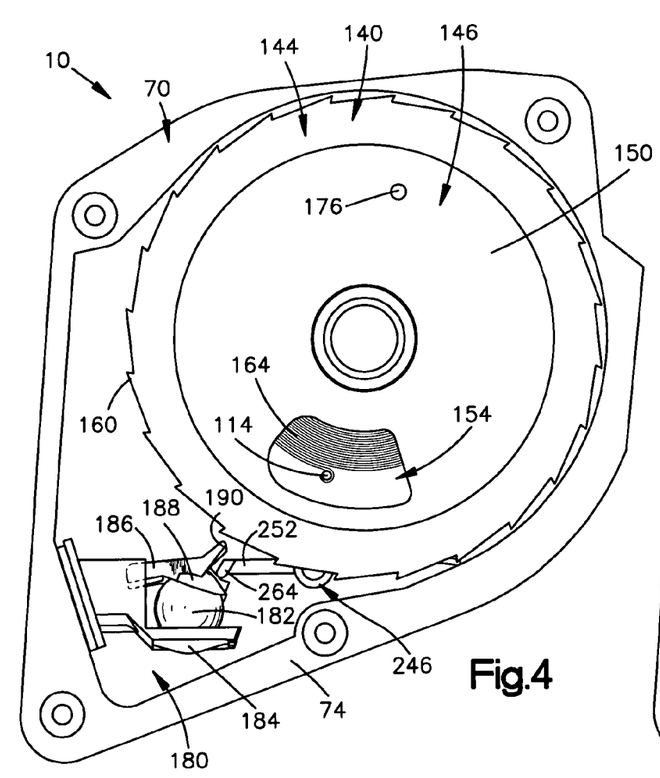
FIG. 4 is a sectional side view illustrating a first portion of the retractor of FIG. 1.

The cup-shaped central portion 146 of the actuator disk 140 includes a radially extending portion 150 and an axially extending portion 152. The radially extending portion 150 extends from the hub portion 142 to the axially extending portion 152. As is shown in FIG. 4, an arcuate opening 154 extends through the radially extending portion 150 of the cup-shaped central portion 146 of the actuator disk 140. The axially extending portion 152 of the cup-shaped central portion 146 of the actuator disk 140 extends axially, relative to axis A, from the radially extending portion 150.

The hub portion 142 and the cup-shaped central portion 146 of the actuator disk 140 collectively form an annular chamber 158 (FIG. 3) in the actuator disk. The annular chamber 158 extends radially between the hub portion 142 and the axially extending portion 152 of the cup-shaped central portion 146 of the actuator disk 140. The arcuate opening 154 in the radially extending portion 150 of the cup-shaped central portion 146 leads to the annular chamber 158. As is shown in FIG. 3, the cylindrical post 114 that extends axially outwardly from the first webbing guide 108 of the spool 104 extends through the arcuate opening 154 and terminates in the annular chamber 158.

The flange portion 144 of the actuator disk 140 extends radially outwardly, relative to axis A, from the axially extending portion 152 of the cup-shaped central portion 146 of the actuator disk. The flange portion 144 is located radially adjacent an opening to the annular chamber 158 in the actuator disk 140. Ratchet teeth 160 are disposed in a circular array on an outer periphery of the flange portion 144.

A spiral spring 164 is located in the annular chamber 158 of the actuator disk 140. The spiral spring 164 includes inner and outer ends 166 and 168, respectively. The inner end 166 of the spiral spring 164 is affixed to the hub portion 142 of the actuator disk 140 and the outer end 168 of the spiral spring is affixed to the cylindrical post 114 that extends into the annular chamber 158 from the first webbing guide 108 of the spool 104. The spiral spring 164 biases the actuator disk 140 for rotation with the spool 104. When relative rotation occurs between the actuator disk 140 and the spool 104, the spiral spring 164 is tensioned.

A locking pawl 172 (FIG. 3) is located within the opening 58 in the first side wall 54 of the frame 50. The locking pawl 172 includes an axially extending shaft 174 that is pivotally supported in the first webbing guide 108 of the spool 104. A protrusion 176 extends axially from the actuator disk 140 and into a slot (not shown) that is formed in the locking pawl 172.

The locking pawl 172 is shown in FIG. 3 in an unactuated condition in which the locking pawl is spaced away from the ratchet teeth 60 on the first side wall 54 of the frame 50. The locking pawl 172 moves from the unactuated condition to an actuated condition in response to relative rotation between the spool 104 and the actuator disk 140. When in the actuated condition, the locking pawl 172 is pivoted relative to the first webbing guide 108 and into engagement with a ratchet tooth 60 on the first side wall 54 of the frame 50. When the locking pawl 172 engages a ratchet tooth 60 on the first side wall 54 of the frame 50, the spool 104 is prevented from rotating relative to the frame 50 in a belt withdrawal direction.

Figure 5:
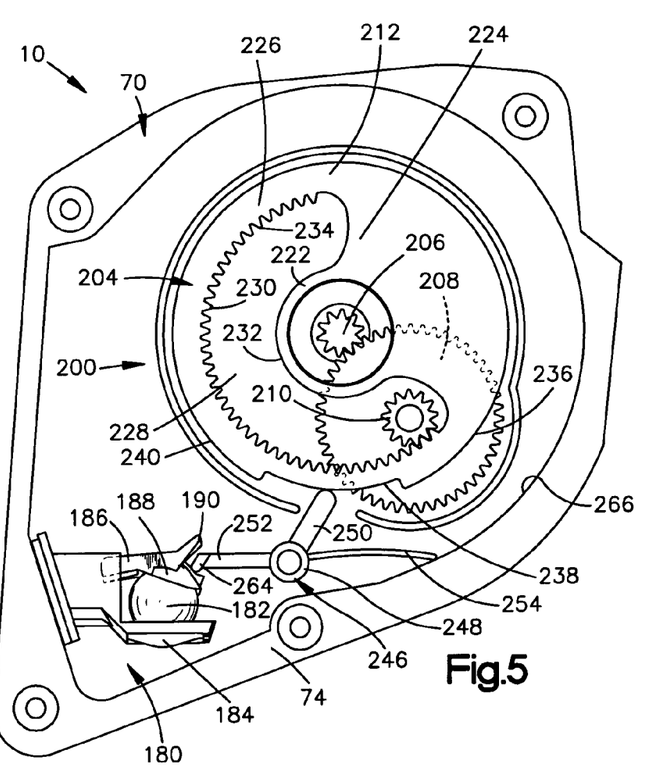
FIG. 5 is a sectional side view illustrating a second portion of the retractor of FIG. 1 in a condition in which the seat belt webbing is retracted completely.

The retractor 10 also includes a vehicle sensitive sensor 180 for sensing vehicle conditions that may be indicative of a vehicle crash event, such as vehicle deceleration and vehicle tilt. As shown in FIGS. 4 and 5, the vehicle sensitive sensor 180 includes an inertial mass 182, which is preferably a corrosion resistant metal, or other high density material, ball. A support portion 184 of the vehicle sensitive sensor 180 supports the inertial mass 182. The support portion 184 is fixed to the cover 70 and is also fixed relative to the frame 50 of the retractor 10.

The vehicle sensitive sensor 180 also includes a sensor lever 186. The sensor lever 186 is pivotally mounted on the support portion 184. The sensor lever 186 includes a cap portion 188 that rests upon the inertial mass 182 and a locking arm 190 that extends generally upwardly and rightward from the cap portion 188, as viewed in FIGS. 4 and 5. The locking arm 190 is disposed in the same plane as the ratchet teeth 160 on the actuator disk 140, as is shown in FIG. 3.

The inertial mass 182 moves relative to the support portion 184 and the sensor lever 186 in response to the sensed vehicle condition. For example, when the vehicle 16 experiences a sudden deceleration, the frame 50 of the retractor 10, which is fixed relative to the vehicle 16, also experiences the deceleration. Since the support portion 184 and the sensor lever 186 of the vehicle sensitive sensor 180 are fixed relative to the frame 50 of the retractor 10, the support portion 184 and the sensor lever 186 also experience the deceleration. The inertial mass 182, however, is not fixed relative to the vehicle 16 and continues in motion as the deceleration occurs. As a result, the inertial mass 182 moves relative to the support portion 184 and the sensor lever 186. Movement of the inertial mass 182 relative to the support portion 184 and the sensor lever 186 of the vehicle sensitive sensor 180 results in pivotal movement of the sensor lever 186 relative to the support portion 184.

Under normal vehicle conditions, the inertial mass 182 rests on the support portion 184 and gravity acts on the sensor lever 186 to position the cap portion 188 of the sensor lever upon the inertial mass, as shown in FIGS. 4 and 5. When the cap portion 188 is positioned upon the inertial mass 182, the locking arm 190 is spaced away from the ratchet teeth 160 on the actuator disk 140, as is shown in FIG. 4. When the inertial mass 182 moves relative to the support portion 184 by at least a predetermined amount, as, for example, when the vehicle 16 experiences a sudden deceleration, the locking arm 190 moves into engagement with a ratchet tooth 160 of the actuator disk 140. The engagement between the locking arm 190 and the ratchet tooth 160 prevents rotation of the actuator disk in the belt withdrawal direction.

When the actuator disk 140 is prevented from rotating in the belt withdrawal direction, the spiral spring 164 resists rotation of the spool 104 in the belt withdrawal direction. When a tension on the seat belt webbing 18 overcomes the bias of the spiral spring 164, as when vehicle deceleration causes a vehicle occupant to apply a load on the webbing, the spool 104 rotates in the belt withdrawal direction. Since the actuator disk 140 is prevented from rotating in the belt withdrawal direction, the spool 104 rotates relative to the actuator disk 140 and the spiral spring 164 is tensioned. As set forth above, the relative rotation between the actuator disk 140 and the spool 104 pivots the locking pawl 172 into the actuated condition in which the locking pawl engages a ratchet tooth 60 on the first side wall 54 of the frame 50. When the locking pawl 172 engages a ratchet tooth 60 on the first side wall 54 of the frame 50, the spool 104 is prevented from rotating in the belt withdrawal direction.

When tension is released from the seat belt webbing 18, as when a deceleration of the vehicle 16 ends, while the locking arm 190 of the sensor lever 186 remains in engagement with a ratchet tooth 160 of the actuator disk 140, the rewind spring acts to rotate the spool 104 in the belt retractor direction. This rotation of the spool 104 removes from the spiral spring 164 the tension that resulted from the rotation of the spool relative to the actuator disk 140. This rotation of the spool 104 in the belt retraction direction also returns the locking pawl 172 to the unactuated condition. When the tension is removed from the spiral spring 164, further rotation of the spool 104 in the belt retraction direction, under the influence of the rewind spring 130, causes the actuator disk 140 to rotate in the belt retraction direction. When the actuator disk 104 rotates in the belt retraction direction, the ratchet tooth 160 moves out of engagement with the locking arm 190 of the sensor lever 186 and the sensor lever is free to return to its original position upon the inertial mass 182.

The retractor 10 also includes a mechanism 200 for controlling the vehicle sensitive sensor 180. The mechanism 200 includes a gear train 204 (FIGS. 3 and 5). The gear train 204 includes a pinion gear 206, first and second intermediate gears 208 and 210, respectively, and a ring gear 212. The pinion gear 206 is formed on the shaft 120 and is fixed for rotation with the spool 104. The pinion gear 206 is in meshing engagement with the first intermediate gear 208. A projection 218 (FIG. 3) extends into the chamber 80 from the cover 70 to support the first intermediate gear 208 for rotation about the projection. The first intermediate gear 208 is formed as one piece with the second intermediate gear 210 and is fixed for rotation with the second intermediate gear. The second intermediate gear 210 has a smaller diameter than the first intermediate gear 208. In the embodiment illustrated in FIG. 3, the diameter of the second intermediate gear 210 is approximately one-third the diameter of the first intermediate gear 208.

As best shown in FIG. 5, the ring gear 212 includes a hub portion 222, an intermediate portion 224, and a peripheral portion 226. The hub portion 222 includes a central opening. As shown in FIG. 3, the protrusion 124 that rotatably supports the shaft 120 extends through the central opening of the hub portion 222 and rotatably supports the ring gear 212 for rotation relative to the cover 70. As a result, the ring gear 212 is coaxial with the pinion gear 206 and is rotatable about axis A.

The peripheral portion 226 of the ring gear 212 is annular and extends completely around the hub portion 222. The intermediate portion 224 of the ring gear 212 connects the hub portion 222 to a segment of the peripheral portion 226. An arcuate opening 228 (FIG. 5) is formed in the ring gear 212 between an interior surface 230 of the peripheral portion 226 and an exterior surface 232 of the hub portion 222 and adjacent to the intermediate portion 224.

Gear teeth 234 are formed on the interior surface 230 of the peripheral portion 226 of the ring gear 212. The gear teeth 234 of the interior surface 230 meshingly engage with the second intermediate gear 210. The peripheral portion 226 of the ring gear 212 also includes an external surface 236 (FIG. 5) having a cam profile. More specifically, with reference to FIG. 5, the external surface 236 of the peripheral portion 226 includes first and second segments 238 and 240, respectively. The first segment 238 has a first radius and the second segment 240 has a second, larger radius. The first and second radii are measured relative to axis A. In FIG. 5, the first segment 238 (i.e., the smaller radius segment) extends over approximately forty-five degrees of the circumference of the peripheral portion 226 and the second segment 240 (i.e., the larger diameter segment) extends over the remaining approximately 315 degrees of the circumference of the peripheral portion.

The gear train 204 is designed so that the ring gear 212 rotates through an angle that is less than the angular extent of the arcuate opening 228 during withdrawal of the seat belt webbing 18 from a completely retracted condition, shown in FIG. 5, to a completely withdrawn condition. Preferably, the ring gear 212 rotates approximately 200 degrees during withdrawal of the seat belt webbing 18 from the completely retracted condition to a completely withdrawn condition.

In addition to the gear train 204, the mechanism 200 for controlling the vehicle sensitive sensor 180 also includes a control lever 246. As is shown in FIG. 5, the control lever 246 includes a central hub 248 and three outwardly extending legs 250, 252 and 254. The hub 248 includes a central opening. A projection 262 (FIG. 3) extends into the chamber 80 from the cover 70 and through the central opening of the hub 248 for pivotally supporting the control lever 246 relative to the cover 70.

The first leg 250 of the control lever 246 extends upwardly and rightward, as viewed in FIG. 5, from the hub 248. The first leg 250 engages the external surface 236 of the peripheral portion 226 of the ring gear 212. FIG. 5 illustrates the first leg 250 contacting the first segment 238 of the external surface 236. The second leg 252 extends leftward, as viewed in FIG. 5, from the hub 248. A blocking arm 264, shown by dashed lines in FIG. 3, extends axially from an end of the second leg 252 opposite the hub 248 to a position in the same plane as the sensor lever 186 of the vehicle sensitive sensor 180. FIG. 5 illustrates the blocking arm 264 engaging the cap portion 188 of the sensor lever 186. The third leg 254 of the control lever 246 has a curved profile and extends rightward, as viewed in FIG. 5. The third leg 254 engages an inner surface 266 of the outer wall 74 of the cover 70 and acts as a cantilever spring to bias the first leg 250 of the control lever 246 into engagement with the external surface 236 of the peripheral portion 226 of the ring gear 212.

When the control lever 246 is in the position shown in FIG. 5, the blocking arm 264 of the second leg 252 prevents pivotal movement of the sensor lever 186 of the vehicle sensitive sensor 180. Thus, when in the position shown in FIG. 5, the control lever 246 disables the vehicle sensitive sensor 180. The vehicle sensitive sensor 180 is disabled when the first leg 250 of the control lever 246 is located adjacent the first segment 238 of the external surface 236 of the peripheral portion 226 of the ring gear 212. The first leg 250 of the control lever 246 is adjacent the first segment 238 of the external surface 236 of the peripheral portion 226 of the ring gear 212 when the seat belt webbing 18 is completely retracted into the retractor 10, as shown in FIG. 5.

Figure 6:
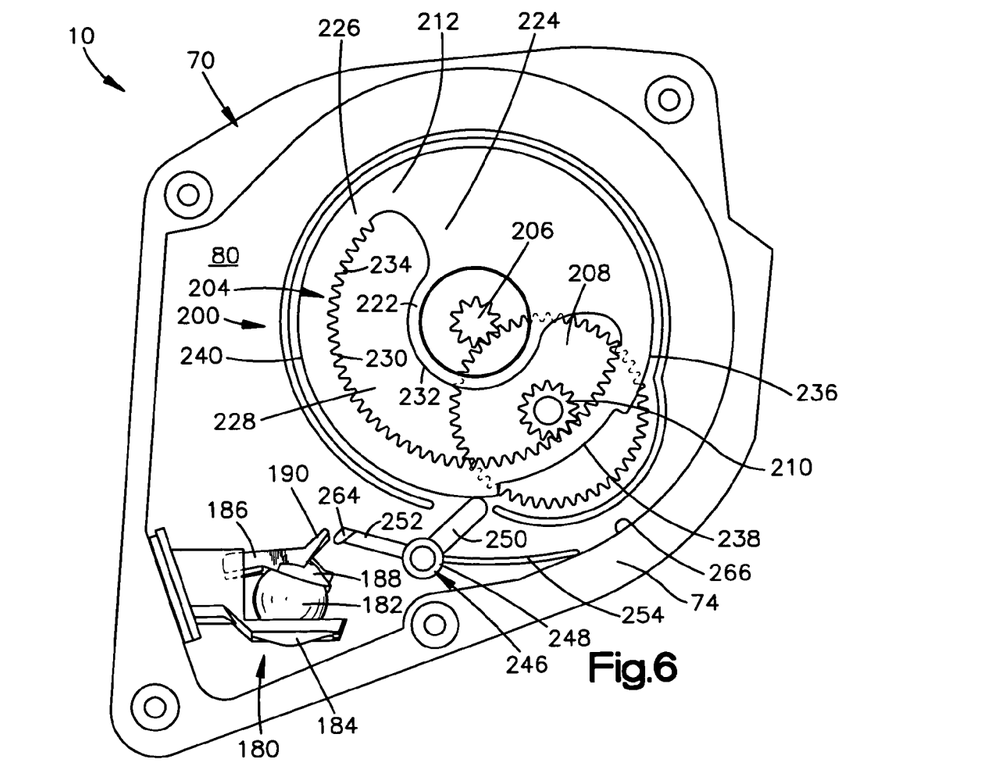
FIG. 6 is a sectional side view illustrating a second portion of the retractor of FIG. 1 in a condition in which a portion of the seat belt webbing is withdrawn from the retractor.

As the seat belt webbing 18 is withdrawn from the retractor 10 and the spool 104 is rotated in the belt withdrawal direction, the ring gear 212 is rotated in a counterclockwise direction, as viewed in FIG. 5. During rotation of the ring gear 212, the first leg 250 of the control lever 246 moves along the external surface 236 of the peripheral portion 226 of the ring gear 212. When a predetermined amount of seat belt webbing 18 has been withdrawn from the retractor 10, the first leg 250 of the control lever 246 engages the second segment 240 of the external surface 236 of the peripheral portion 226 of the ring gear 212, as is shown in FIG. 6. When the first leg 250 of the control lever 246 transitions from the first segment 238 to the second segment 240, the control lever 246 pivots clockwise from the position shown in FIG. 5 to the position shown in FIG. 6. The predetermined amount of seat belt webbing 18 at which the first leg 250 of the control lever 246 transitions from the first segment 238 to the second segment 240 preferably is an amount of seat belt webbing needed to enabling latching of the tongue assembly 32 in the buckle assembly 34 when the seat 14 is empty.

When the first leg 250 of the control lever 246 engages the second segment 240 of the external surface 236 of the ring gear 212, the blocking arm 264 of the second leg 252 of the control lever 246 is spaced away from the cap portion 188 of the sensor lever 186 of the vehicle sensitive sensor 180, as is shown in FIG. 6. As a result, operation of the vehicle sensitive sensor 180 of the retractor 10 is enabled. Thus, the mechanism 200 for controlling the vehicle sensitive sensor 180 is responsive to the withdrawn length of the seat belt webbing 18 for enabling and disabling the vehicle sensitive sensor of the retractor 10.

Figure 7:
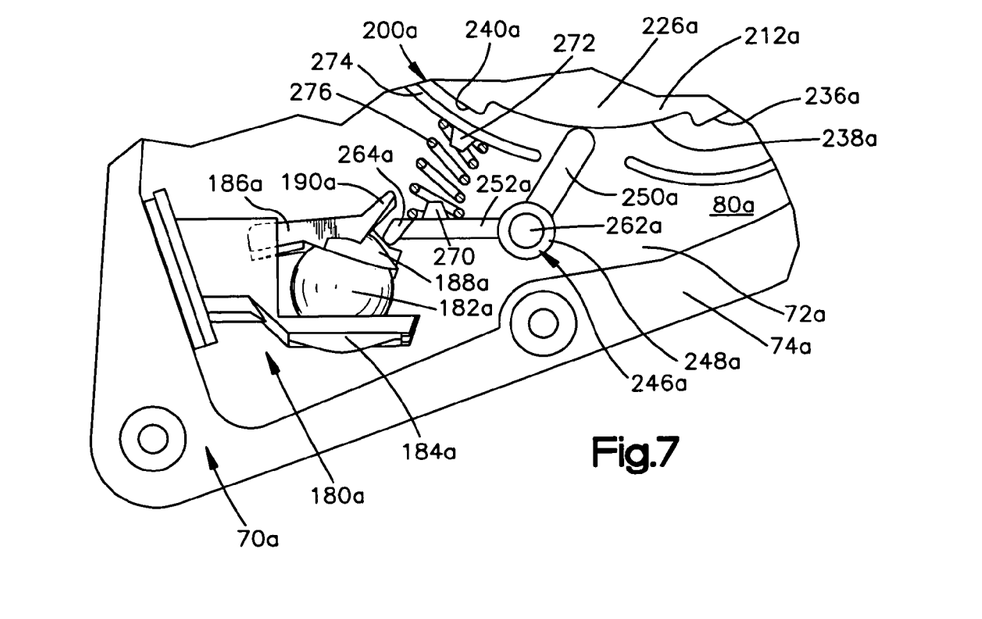
FIG. 7 is an enlarged view illustrating an alternative construction for a mechanism of the retractor of FIG. 1.

FIG. 7 is an enlarged view illustrating an alternative construction for a mechanism 200a for controlling a vehicle sensitive sensor 180a of the retractor 10 of FIG. 1. The same reference numbers with the addition of the suffix "a" identify structures in FIG. 7 that are the same as or similar to those described with reference to FIGS. 2–6.

The control lever 246a of the mechanism 200a for controlling the vehicle sensitive sensor 180a includes a central hub 248a and first and second outwardly extending legs 250a and 252a, respectively. The hub 248a includes a central opening that receives a projection 262a of the cover 70a so that the hub is pivotally supported on the projection. The first leg 250a of the control lever 246a extends upwardly and rightward, as viewed in FIG. 7, from the hub 248a. The first leg 250a engages the external surface 236a of the peripheral portion 226a of the ring gear 212a. FIG. 7 illustrates the first leg 250a engaging the first segment 238a of the external surface 236a. Instead of actually engaging the first segment 238a of the external surface 236a, a small gap may separate the first leg 250a and the first segment 238a. The second leg 252a extends leftward, as viewed in FIG. 7, from the hub 248a. A blocking arm 264a of the second leg 252a extends into a position in the same plane as the sensor lever 186a of the vehicle sensitive sensor 180a. FIG. 7 illustrates the blocking arm 264a engaging the cap portion 188a of the sensor lever 186a.

A first spring seat 270 is located on an upper surface of the second leg 252a of the control lever 246a. A second spring seat 272 is located on a protrusion 274 that extends into the chamber 80a from the end wall 72a of the cover 70a. The second spring seat 272 is located above and slightly to the right, as viewed in FIG. 7, of the first spring seat 270. A helically wound spring 276 includes opposite ends that are affixed to the first and second spring seats 270 and 272, respectively. The spring 276 biases the first leg 250a of the control lever 246a into engagement with the cam profile of the external surface 236a of the peripheral portion 226a of the ring gear 212a. The mechanism 200a for controlling the vehicle sensitive sensor 180a of FIG. 7 operates in the same manner as the mechanism 200 described with reference to FIGS. 2–6. Particularly, when the first leg 250a of the control lever 246a is located adjacent the first segment 238a of the external surface 236a of the ring gear 212a, the blocking arm 264a of the second leg 252a of the control lever 246a engages the cap portion 188a of the vehicle sensitive sensor 180a and disables the vehicle sensitive sensor. When the first leg 250a of the control lever 246a engages the second segment 240a of the external surface 236a of the ring gear 212a, the blocking arm 264a of the second leg 252a of the control lever 246a is spaced away from the cap portion 188a of the vehicle sensitive sensor 180a and the vehicle sensitive sensor is enabled or operational.

Figure 8:
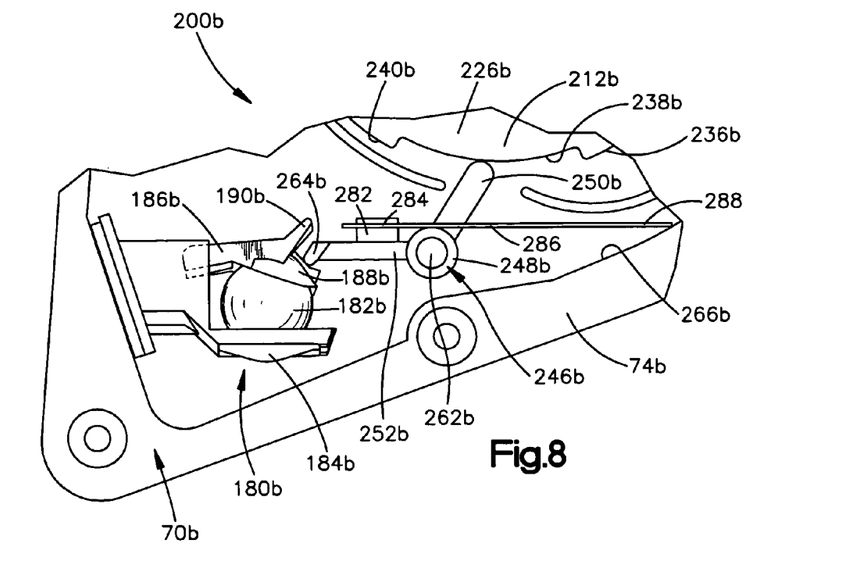
FIG. 8 is an enlarged view illustrating a second alternative construction for a mechanism of the retractor of FIG. 1.

FIG. 8 is an enlarged view illustrating a second alternative construction for a mechanism 200b for controlling a vehicle sensitive sensor 180b of the retractor 10 of FIG. 1. The same reference numbers with the addition of the suffix "b" identify structures in FIG. 8 that are the same as or similar to those described with reference to FIGS. 2–6.

The control lever 246b of the mechanism 200b for controlling the vehicle sensitive sensor 180b includes a central hub 248b and first and second outwardly extending legs 250b and 252b. The hub 248b includes a central opening that is receives a projection 262b of the cover 70b so that the hub is pivotally supported on the projection. The first leg 250b of the control lever 246b extends upwardly and rightward, as viewed in FIG. 8, from the hub 248b. The first leg 250b engages the external surface 236b of the peripheral portion 226b of the ring gear 212b. FIG. 8 illustrates the first leg 250b engaging the first segment 238b of the external surface 236b. Instead of actually engaging the first segment 238b of the external surface 236b, a small gap may separate the first leg 250b and the first segment 238b. The second leg 252b extends leftward, as viewed in FIG. 8, from the hub 248b. A blocking arm 264b of the second leg 252b extends into a position in the same plane as the sensor lever 186b of the vehicle sensitive sensor 180b. FIG. 8 illustrates the blocking arm 264b engaging the cap portion 188b of the sensor lever 186b.

A spring seat 282 is located on an upper surface of the second leg 252b of the control lever 246b. A first end 284 of a flat spring 286 is affixed to the spring seat 282. A second end 288 of the spring 286 engages the inner surface 266b of the outer wall 74b of the cover 70b. The spring 286 biases the first leg 250b of the control lever 246b into engagement with the cam profile of the external surface 236b of the peripheral portion 226b of the ring gear 212b. The mechanism 200b for controlling the vehicle sensitive sensor 180b of FIG. 8 operates in the same manner as the mechanism 200 described with reference to FIGS. 2–6 for enabling and disabling the vehicle sensitive sensor 180b.

Figure 9:
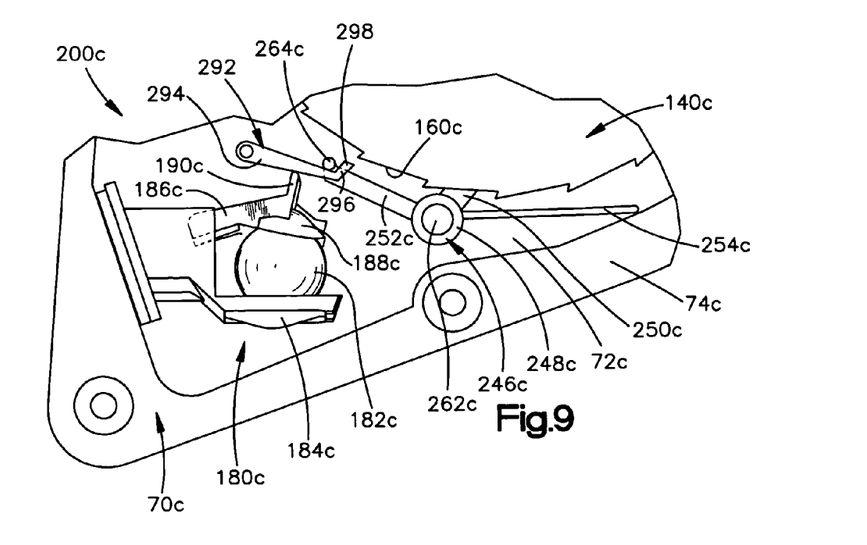
FIG. 9 is an enlarged view illustrating a third alternative construction for a mechanism of the retractor of FIG. 1.

FIG. 9 is an enlarged view illustrating a third alternative construction for a mechanism 200c for controlling a vehicle sensitive sensor 180c of the retractor 10 of FIG. 1. The same reference numbers with the addition of the suffix "c" identify structures in FIG. 9 that are the same as or similar to those described with reference to FIGS. 2–6.

In FIG. 9, a link lever 292 is pivotally mounted to the end wall 72c of the cover 70c. The link lever 292 includes an elongated portion 294 and a toothed portion 296. The elongated portion 294 of the link lever 292 extends over the locking arm 190c of the cap portion 188c of the vehicle sensitive sensor 180c. The toothed portion 296 of the link lever 292 includes a locking tooth 298 that is adapted for engaging a ratchet tooth 160c on the actuator disk 140c for preventing rotation of the actuator disk in the belt withdrawal direction.

Under normal vehicle conditions, the locking tooth 298 of the toothed portion 296 of the link lever 292 is spaced away from the actuator disk 140c, as shown in FIG. 9. When the vehicle sensitive sensor 180c senses a vehicle crash condition, pivotal movement of the cap portion 188c of the vehicle sensitive sensor 180c causes the link lever 292 to pivot and forces the locking tooth 298 of the toothed portion 296 of the link lever 292 into engagement with a ratchet tooth 160c of the actuator disk 140c to prevent rotation of the actuator disk in the belt withdrawal direction.

The mechanism 200c for controlling the vehicle sensitive sensor 180c of FIG. 9 is identical to the mechanism 200 described with reference to FIGS. 3–6 with the exception that the blocking arm 264c of the second leg 252c of the control lever 246c in FIG. 9 acts on the elongated portion 294 of the link lever 292 instead of on the cap portion 188c of the vehicle sensitive sensor 180c. The mechanism 200c for controlling the vehicle sensitive sensor 180c of FIG. 9 operates in a manner similar to the mechanism 200 described with reference to FIGS. 3–6.

From the above description of the invention, those skilled in the art will perceive improvements, changes and modifications. Such improvements, changes and modifications within the skill of the art are intended to be covered by the appended claims.

Having described the invention, we claim the following:

1. A seat belt retractor comprising:
   a spool about which a seat belt webbing is wound, the spool being supported for rotation in a belt withdrawal direction and an opposite belt retraction direction;
   a vehicle sensitive sensor that is responsive to at least one sensed vehicle condition for preventing rotation of the spool in the belt withdrawal direction; and
   a mechanism for controlling the vehicle sensitive sensor, the mechanism including a ring gear and a control lever, a peripheral portion of the ring gear having an external surface having a cam profile, the cam profile of the ring gear actuating the control lever to enable and disable the vehicle sensitive sensor.

2. The retractor of claim 1 wherein the external surface of the ring gear includes first and second segments, the first segment having a first radius and the second segment having a second different radius, the first and second segments collectively forming the cam profile of the external surface, the control lever, when located adjacent the first segment, disabling the vehicle sensitive sensor and, when located adjacent the second segment, enabling the vehicle sensitive sensor.

3. The retractor of claim 1 wherein the ring gear also has internal gear teeth, the internal gear teeth being located radially inwardly from the external surface having the cam profile.

4. The retractor of claim 1 further including an actuator disk that tends to rotate with the spool in the belt withdrawal direction and in the belt retraction direction, the actuator disk having a plurality of ratchet teeth, the vehicle sensitive sensor, when enabled, being responsive to the at least one sensed vehicle condition for moving a locking tooth into engagement with one of the ratchet teeth of the actuator disk for preventing rotation of the actuator disk in the belt withdrawal direction.

5. The retractor of claim 4 wherein the locking tooth is formed on a link lever, the vehicle sensitive sensor being responsive to the at least one sensed vehicle condition for moving the locking tooth of the link lever relative to the actuator disk.

6. The retractor of claim 4 further including a locking pawl that is actuatable for engaging structure of the retractor for preventing rotation of the spool in the belt withdrawal direction, the locking pawl being actuated in response to relative rotation between the actuator disk and the spool, relative rotation between the actuator disk and the spool occurring only in response to the vehicle sensitive sensor preventing rotation of the actuator disk in the belt withdrawal direction.

7. The retractor of claim 1 wherein the mechanism includes a biasing member for biasing a portion of the control lever into engagement with the external surface of the ring gear.

8. The retractor of claim 7 wherein the biasing member is a spring that is attached to the control lever.

9. The retractor of claim 7 wherein the biasing member, is a leg of the control lever that acts as a cantilevered spring.

10. The retractor of claim 7 wherein the control lever further includes a blocking arm for engaging the vehicle sensitive sensor for disabling the vehicle sensitive sensor, the blocking arm being fixed relative to the portion of the control lever that engages the external cam profile of the ring gear, movement of the control lever moving the blocking arm into and out of engagement with the vehicle sensitive sensor.

11. The retractor of claim 7 wherein the control lever includes first, second, and third legs, the first leg engaging the external surface of the ring gear and controlling a pivotal movement of the control lever, the second leg including a blocking arm for engaging the vehicle sensitive sensor to disable the vehicle sensitive sensor, and the third leg biasing the first leg into engagement with the external surface of the ring gear.

12. A seat belt retractor comprising:
   a spool about which a seat belt webbing is wound, the spool being supported for rotation in a belt withdrawal direction and in an opposite belt retraction direction;
   a vehicle sensitive sensor that is responsive to at least one sensed vehicle condition for preventing rotation of the spool in the belt withdrawal direction; and
   a mechanism for controlling the vehicle sensitive sensor, the mechanism including a ring gear and a control lever, the ring gear having a peripheral portion having radially opposite inner surfaces, a cam profile being formed on a first one of the inner and outer surfaces and gear teeth being formed on a second one of the inner and outer surfaces, the cam profile of the peripheral portion of the ring gear actuating the control lever to enable and disable the vehicle sensitive sensor.

13. The retractor of claim 12 wherein the ring gear further includes a hub portion that is connected to the peripheral portion, an outer surface of the hub portion and the inner surface of the peripheral portion defining, at least in part, an arcuate opening in the ring gear.

14. The retractor of claim 12 wherein the mechanism includes a biasing member for biasing a portion of the control lever into engagement with the cam profile of the ring gear.

15. A seat belt retractor comprising:
   a spool about which a seat belt webbing wound, the spool being supported for rotation in a belt withdrawal direction and in an opposite belt retraction direction;
   a vehicle sensitive sensor that responsive to at least one sensed vehicle condition for preventing rotation of the spool in the belt withdrawal direction; and
   a mechanism for controlling the vehicle sensitive sensor, the mechanism including a ring gear and a control lever, the ring gear having a peripheral portion having radially opposite inner and outer surfaces and an arcuate opening located adjacent the inner surface of the peripheral portion, a cam profile being formed on the outer surface and gear teeth being formed on the inner surface, the gear teeth extending along the arcuate opening;
   the cam profile of the ring gear actuating the control lever to enable and disable the vehicle sensitive sensor.

16. The retractor of claim 15 wherein the ring gear further includes a hub portion that is connected to the peripheral portion, an outer surface of the hub portion and the inner surface of the peripheral portion defining, at least in part, the arcuate opening.

17. The retractor of claim 15 wherein the mechanism includes a biasing member for biasing a portion of the control lever into engagement with the cam profile of the ring gear.

* * * * *